(12) United States Patent
Schlansker et al.

(10) Patent No.: US 7,912,998 B2
(45) Date of Patent: Mar. 22, 2011

(54) DMA ACCESS SYSTEMS AND METHODS

(75) Inventors: Michael Steven Schlansker, Palo Alto, CA (US); Erwin Oertli, Palo Alto, CA (US); Jean-Francois Collard, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 11/326,918

(22) Filed: Jan. 6, 2006

(65) Prior Publication Data

US 2007/0174505 A1    Jul. 26, 2007

(51) Int. Cl.
*G06F 13/00* (2006.01)
(52) U.S. Cl. .................. 710/32; 710/4; 710/9; 710/15; 710/18; 710/19; 710/22; 710/26; 710/28; 710/305; 710/308; 710/317
(58) Field of Classification Search ............... 710/4, 9, 710/15, 18, 19, 22, 26, 28, 32, 305, 308, 710/317
See application file for complete search history.

(56) References Cited

U.S. PATENT DOCUMENTS

| | | | | |
|---|---|---|---|---|
| 5,588,131 A * | 12/1996 | Borrill | ........................ | 711/146 |
| 5,748,945 A * | 5/1998 | Ng | ................. | 703/23 |
| 6,055,619 A * | 4/2000 | North et al. | .................... | 712/36 |
| 6,662,289 B1 * | 12/2003 | Ang | .............................. | 711/202 |
| 7,206,879 B2 * | 4/2007 | Sano et al. | .................... | 710/105 |
| 7,206,906 B1 * | 4/2007 | Cholleti et al. | ............... | 711/152 |
| 7,269,825 B1 * | 9/2007 | Adcock | ........................ | 717/136 |
| 2002/0026543 A1 * | 2/2002 | Tojima et al. | ................... | 710/22 |
| 2004/0003145 A1 * | 1/2004 | Schneiderman et al. | ....... | 710/25 |
| 2004/0225760 A1 * | 11/2004 | Lee | ............................. | 710/22 |

* cited by examiner

*Primary Examiner* — Tariq Hafiz
*Assistant Examiner* — Jasjit S Vidwan

(57) ABSTRACT

Methods and systems for performing direct memory access (DMA) transfers are described. An invalidate queue (or other storage device) contains an entry associated with a DMA transfer in progress. If the invalidate queue detects an invalidation of a memory page associated with that entry, then it is marked invalid. If the entry is marked invalid during the DMA transfer, then that DMA transfer is aborted. This enables, among other things, DMA transfers to unpinned virtual memory.

20 Claims, 3 Drawing Sheets

DMA ACCESS SYSTEMS AND METHODS

BACKGROUND

The present invention relates generally to data communication systems and methods and, more particularly, to data communication systems and methods in which direct memory access (DMA) transfers are performed.

A network interface controller (NIC) is a hardware device that supports the transmission of data between computers. A common source and destination for transmitted data is paged virtual memory within a general-purpose computer system. General-purpose processors incorporate address translation hardware to facilitate virtual page access. Paged virtual memory provides for virtual addresses which are translated or mapped onto physical pages and that a virtual page may be swapped out to disk or removed from main memory and later swapped in from disk to a new physical page location. An operating system can unilaterally perform page swaps of so-called unpinned virtual pages. Thus, application software operating on such network systems typically accesses main memory using address translation hardware that ensures that the correct physical page is accessed, e.g., that the operating system has not initiated a page swap for the page that the software needs to access. Software access pauses during time intervals when needed data is swapped out and resumes by accessing a new physical location when data is swapped in at that location.

Some networking solutions address the downtime associated with software suspension during virtual page swapping by providing for software to copy data from unpinned virtual memory to pinned interface memory. Pinned memory consists of pages that cannot be swapped to disk by the operating system. In such systems, the NIC only accesses pinned interface memory. This simplifies DMA transfers performed by the NIC as data is never swapped during a network operation which, in turn, guarantees that data remains accessible throughout a NIC's DMA data transfer and that the physical address of the data remains constant. However, such solutions require extra overhead in the form of data copying (e.g., from unpinned virtual memory to a pinned system buffer accessible by the NIC) that utilizes important system resources.

Another solution to the issue posed by unpinned virtual memory eliminates the above-described data copying but requires that software invoke an operating system function to pin a user page prior to transmitting data directly from or to that user page. Additionally, the page is later unpinned in order to allow page swapping after network activity is finished. While this eliminates copies to pinned pages, software must now invoke expensive page pinning and page unpinning functions.

Accordingly, it would be desirable to provide mechanisms and methods which enable a NIC to directly access unpinned paged virtual memory without employing, for example, data copying or page pinning/page unpinning functions.

SUMMARY

According to one exemplary embodiment of the present invention, a direct memory access (DMA) monitoring method includes the steps of placing an entry in a storage device including a memory address associated with a DMA transfer, monitoring an interconnect during the DMA transfer and selectively invalidating the entry, and determining whether the entry was invalidated.

According to another exemplary embodiment of the present invention, a direct memory access (DMA) transfer device includes a storage device associated with the DMA transfer device for holding an entry including a memory address for which a direct memory access (DMA) transfer is pending and a DMA access engine for performing the DMA transfer, wherein the storage device queue monitors an interconnect during the DMA transfer and selectively invalidates the entry; further wherein the storage device sends an abort DMA transfer signal to the DMA access engine if the entry is invalidated.

According to yet another exemplary embodiment of the present invention, a system for performing a direct memory access (DMA) transfer includes means for placing an entry in a storage device including a memory address associated with the DMA transfer, means for monitoring an interconnect during the DMA transfer and selectively invalidating the entry, means for determining whether the entry was invalidated during the DMA transfer and means for aborting the DMA transfer if the entry was invalidated during the DMA transfer.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
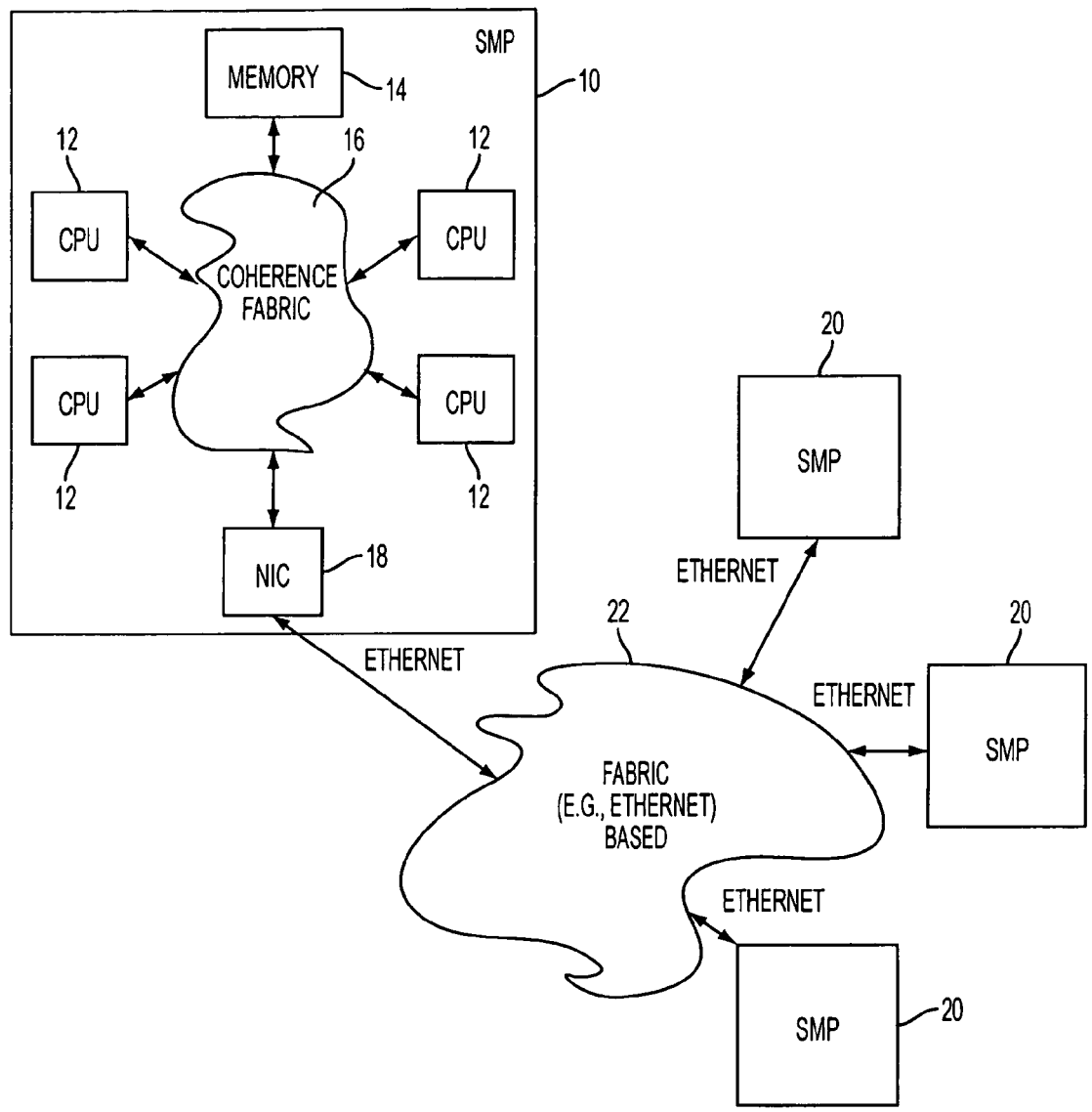
FIG. 1 illustrates an exemplary system in which exemplary embodiments of the present invention can be implemented

As context, consider the exemplary system of FIG. 1. Therein a symmetric multiprocessor (SMP) system 10 includes a number of central processor units (CPUs) 12 which share memory unit 14 via coherence fabric 16. Although SMP 10 is shown as having four CPUs (cores), those skilled in the art will appreciate that SMP 10 can have more or fewer CPUs. SMP 10 sends messages to other SMPs 20 under the control of NIC 18 via Ethernet connections and a fabric (switch) 22. The NIC 18 will typically have a processor (not shown) associated therewith, either as an integral part of the NIC or in the form of a helper processor, so that the NIC has sufficient intelligence to interpret various commands. The fabric 22 will route messages to their intended recipients, although occasionally messages will be dropped such that the system illustrated in FIG. 1 should support retransmission of dropped messages. Note that the above described system is purely exemplary and that the present invention is equally applicable to, among other things, systems involving single processor systems.

Figure 2:
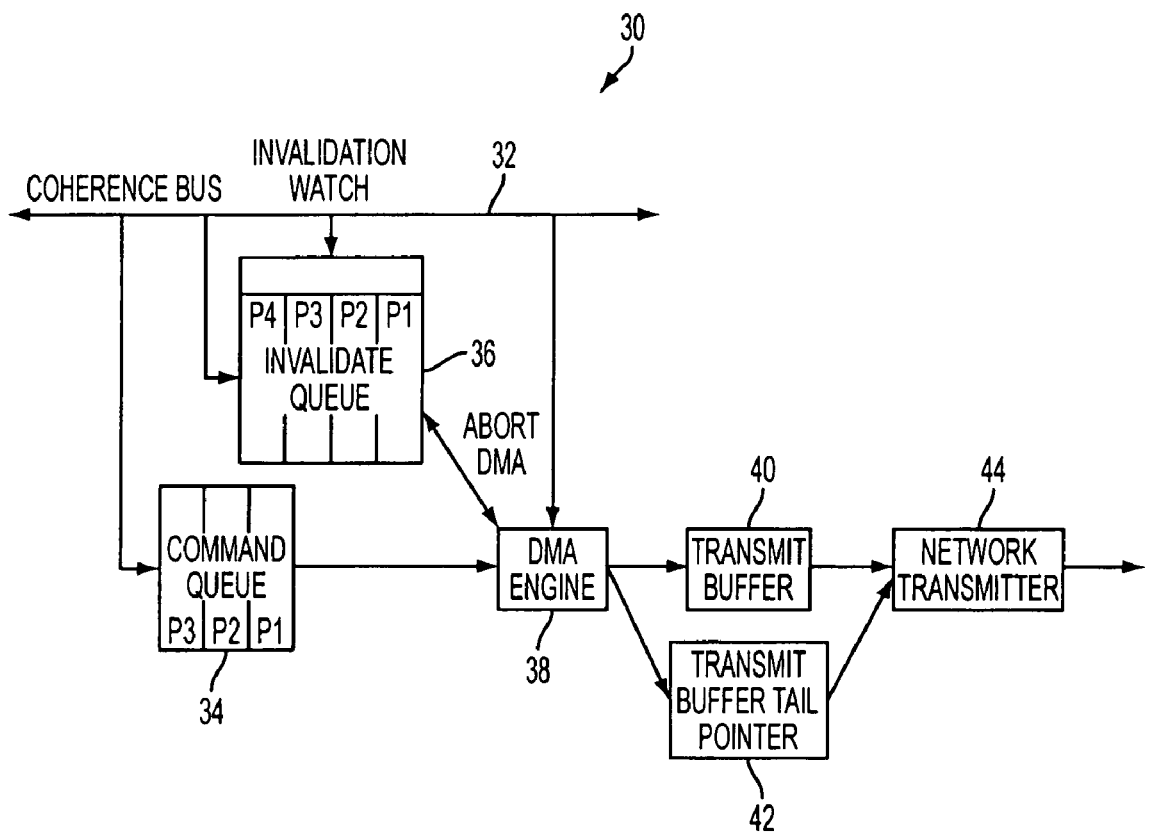
FIG. 2 depicts a portion of a NIC according to an exemplary embodiment of the present invention including a DMA transfer mechanism.

FIG. 2 illustrates the transmit section of an exemplary NIC (generally referred to by reference numeral 30) that, according to an exemplary embodiment of the present invention, facilitates access to data stored in unpinned memory pages. The NIC 30 is accessed through a coherence interconnect 32 that supports transactions such as memory reads and writes. Memory-mapped operations can be used to access control and status registers to control and monitor the NIC 30. In this exemplary device, two input queues 34 and 36 are provided to control the NIC. The command queue 34 provides a primary command interface that identifies data that is to be transmitted. The invalidate queue 36 is used to facilitate access to unpinned virtual pages of memory. Note that as used herein, the phrase "invalidate queue" refers generically to a storage device for one or more addresses to be monitored and can include, for example, a set of registers.

To better understand how the exemplary NIC 30 can be operated to access unpinned virtual pages in memory, consider the following example. Suppose that software (e.g., running on one or more of the CPUs 12) wishes to transmit a message of length L from a process Q starting at virtual address V. To simplify this example, it is assumed that this message does not span page boundaries and that, for each message, all referenced data lies within the same page. Since the NIC 30 uses a physical address to perform data transfers associated with network transmission, the first step in this process is to obtain a physical address associated with the virtual address V. To obtain a physical address, the software invokes an operating system function to perform a translation, e.g., the function P=translate(Q,V) translates the virtual address V for process Q into a physical address that is returned as the parameter P. According to one exemplary embodiment of the present invention, the translation function P is performed in software. A general purpose processor (not shown in FIG. 2) is attached to the coherence interconnect 32. An operating system running on the general purpose processor maintains page tables that accurately specify current virtual page translations. The operating system ensures that page table accuracy is maintained. A kernel-level program or device driver program may access page tables in order to determine the physical address corresponding to a given virtual address. Using this function, the software can determine any virtual address for any process at any moment in time. However, when referencing an unpinned page in virtual memory, the address returned by this function may change at any moment in time as a page is evicted to disk and later re-paged in from disk to a new physical page location.

After translation, a command to retrieve data from physical address P is placed into the DMA engine 38's command queue 34 and a corresponding invalidate address is added to the invalidate queue 36. According to one exemplary embodiment of the present invention, each time a new command is to be added to the command queue 34, its corresponding invalidate address is added to the invalidate queue 36 before it is added to the command queue 34. This guards against the possibility that an address associated with a DMA transfer is invalidated just after the command is inserted into the command queue 34 but before there is sufficient time for the invalidate queue 36 to monitor that address.

This timing aspect of queue management according to an exemplary embodiment of the present invention can be seen in FIG. 2. Therein, software has inserted an entry in the invalidate queue 36 for page p1 and then a transmit command into command queue 34 for page p1. Similarly, software inserted both an invalidate entry and transmit queue entry for subsequent pages p2 and p3. Although software has already inserted the invalidate queue entry for p4, it has not yet inserted the command queue entry for p4 at the time instant illustrated in FIG. 2. Software will insert a command queue entry associated with page p4 to complete the transaction.

In order to ensure that a DMA transfer is correct, the invalidate queue 36 watches the coherence interconnect 32 for a signal that would indicate that a page has been invalidated. It is assumed that whenever an operating system removes a page from service, it will first notify all processors that are accessing that page that the page is no longer accessible. In this exemplary system, the NIC 30 acts as a processor that is responsible for directly accessing unpinned data. When a page is invalidated, the operating system sends a signal indicating that the page at address P is no longer valid. The invalidate queue 36 is able to respond to this signal by watching the coherence interconnect 32. If an invalidate signal matches a valid entry in the invalidate queue 36, then that entry is marked as invalid by the invalidate queue 36. The DMA transfer is considered complete when a page access is valid for the entire duration of a DMA transfer.

Figure 3:
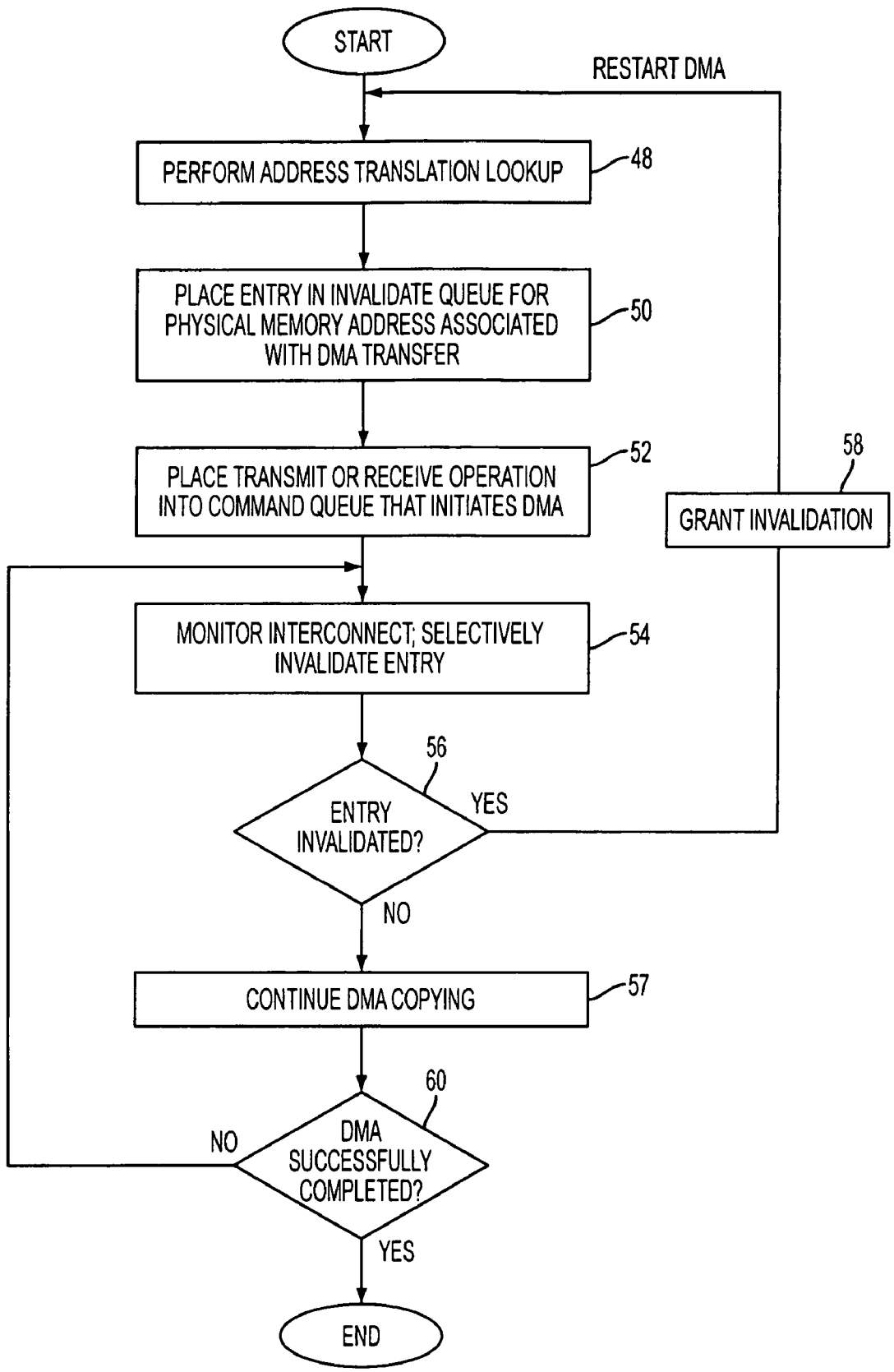
FIG. 3 is a flow chart depicting a method for performing a DMA transfer according to an exemplary embodiment of the present invention.

A method for validating/invalidating a DMA transfer associated with a transmission (or reception) by a NIC according to an exemplary embodiment of the present invention is illustrated in the flowchart of FIG. 3. First, address translation is performed to translate the virtual address for the source or target DMA location at step 48. Then, a valid entry E is placed in the invalidate queue 36 with physical address P at step 50. The physical address P can be checked to ensure that it is a valid translation P=translate(Q,V) for the originating process Q and virtual page V. Next, a transmit or receive operation command is placed into command queue 34 at step 52. The invalidate queue 36 then begins watching the coherence interconnect 32 for any potential invalidation of address P at step 54 and continues to monitor the coherence interconnect 32 until the DMA transfer associated with address P is complete (the loop associated with steps 54, 56 and 57). If a signal is detected on the interconnect 32, then the entry is selectively invalidated at step 56, resulting in a grant invalidation (abort signal) at step 58 and restart of the DMA transfer. The grant invalidate step occurs after DMA access has terminated. At this time, a signal may be generated that gives permission to an operating system to re-map this page for some new use. This grant invalidation signal provides a guarantee to the operating system that no unfinished DMA access from a prior use of the page will access or corrupt data after the page is re-mapped for a new use. In the exemplary case of a transmit-side DMA transfer, when the DMA is aborted, the tail pointer 42 is not updated and the data is not logically appended to the tail of the transmit buffer 40. A partial transfer may result when some data is copied into the transmit buffer 40 but the tail pointer 42 is not updated, i.e., as if the DMA transfer has not taken place at all. In either case, the un-transmitted message is lost and automatically results in a message retransmission when a reliable protocol such as TCP is used. Receive-side DMA transfers by NIC 30, e.g., wherein the NIC 18 is receiving data from another SMP 20 for transfer to one or more CPUs 12) are discussed below.

Otherwise, if the invalidate queue 36 retains a valid entry E for address P after the DMA transfer is completed, then the DMA transfer to/from the unpinned memory page was successful at step 60, ending the flow in FIG. 3, and the data associated with the DMA transfer can continue to be processed. In the exemplary case of a transmit-side DMA, the data obtained from the DMA transfer can be appended to the transmit buffer 40 by updating the tail pointer 42 for this data structure as part of the continued processing referenced by block 60. The NIC 30's network transmitter 44 will then transmit this data, e.g., across fabric 22 to another SMP 20. The following pseudo-code illustrates one exemplary technique method to transmit DMA from an unpinned page a message of length L, by process 0, starting at virtual address V.

```
Success = false;
While (!success) {
    P_old=nil:
    p_new=translate(Q,V);
    e = find_empty_invalidate_entry( );
    /* finds an empty entry named e */
    While (p_old != p_new) { /* exits when
    entry for page remains valid */
        add_valid_entry(e, p_new); /* insert valid
        entry for physical page into e */
        p_old = p_new; p_new=translate(Q,v);
        }
    DMA_to_transmit_queue(p2,L); /* append data to end of
    transmit queue */
    success=invalidate_queue_check(e); /* tests that no invalidate
    signal has occurred */
}
update_transmit_queue_tail_pointer( ); /*commit data to
transmit queue */
invalidate_queue_remove(e); /* remove entry*/
```

In some implementations, the execution time cost for executing the translate function may be substantial. According to some exemplary embodiments of the present invention, this execution time cost can be reduced by using a translation cache function. A translation cache function predicts a current virtual translation using prior translations. Such caches can be implemented efficiently using techniques such as a hash table. The cache is queried for a page prediction for process Q's virtual address V using the function P=cache_value(Q, V). P returns the predicted value for a translation. If there is no current prediction, the returned value for P is nil. The nil value is not equal to any other legitimate physical page. When it is known that P is the correct translation of process Q's virtual address V. then the known translation is inserted into the cache using the function cache_insert(Q, V. P). This allows a subsequent use of the cache as a predictor to return the page P as a predicted physical page for an access by process Q to virtual page V. However, this is only a prediction because the virtual page system may have moved the virtual page to a new location. The exemplary pseudo-code below illustrates one way in which a translation cache function can be incorporated into techniques for allowing a NIC to access unpinned pages, in order to reduce the number of calls to the translate function.

```
Success = false;
While (!success) {
    P_old=nil;
    p_new=cache_value(Q,V); /* get a predicted value */
    if(p_new2 == nil) p_new = translate(Q,V); /* if no prior prediction
    exists create one */        e = find_empty_invalidate_entry( );
    While (p_old != p_new) { /*exits when entry for page
    remains valid */
        add_valid_entry(e, p_new); /* insert valid entry for
        physical page into e */ p_old=p_new;
        p_new=translate(Q,V);
        cache_insert(Q,V, p_new); /* incorporate latest
        translation into predictor */
        }
    DMA_to_transmit_queue(p2,L); /* append data to end
    of transmit queue */
    success=invalidate_queue_check(e); / * tests that no invalidate
    signal has occurred
*/
}
update_transmit_queue_tail_pointer( ); /* commit data to
transmit queue */ invalidate_queue_remove(e); /* remove
entry */
```

It may also be desirable to allow the receive unit (not shown) within the NIC 30 to directly deposit received data into an unpinned page within the user's virtual address space. Receive-side DMA according to exemplary embodiments of the present invention can be performed in much the same manner as transmit-side DMA, described above. However, receive-side DMA is responsible for writing into the user address space. After a DMA is initiated, correctness requires that that data is written only to the correct physical page. If, after a DMA is initiated, the operating system invalidates access to the destination physical page, then all writes to that page should be immediately stopped. This allows the physical page, after invalidation, to be used to represent another virtual page without danger of overwriting that new virtual page. Also note in this regard that the phrases "DMA transfer" and "transfer buffer" as used herein are generic to transmit-side DMA and receive-side DMA.

Although the foregoing exemplary embodiments have described DMA transfers associated with NICs, it will be appreciated that DMA access in accordance with the present invention can be used with other data transfer operations such as graphics, image processing, or signal processing. In such operations it may be important to move large amounts of data from a process that produces the data to a process that consumes the data. For example, data might be moved from system memory of a multiprocessor to a dedicated processing buffer for a specialized graphics or image processor. If data sometimes resides in a virtual memory that is managed by an operating system, and a DMA device is used to move that data, then exemplary embodiments of the present invention can be used to support the efficient motion of that data for a variety of purposes.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A direct memory access (DMA) monitoring method comprising the steps of:
    placing an entry in a storage queue separate from a DMA command queue, said entry including a memory address associated with a DMA transfer;
    monitoring an interconnect during the DMA transfer and selectively invalidating said entry based on said monitoring; and
    determining whether said entry was invalidated.

2. The method of claim 1, wherein said DMA transfer is performed under control of a network interface controller (NIC), said NIC providing a transmit/receive interface between an associated multiple processor system and a plurality of other multiple processor systems via a switching fabric.

3. The method of claim 1, wherein said address is a physical address and further comprising the step of:

determining whether said physical address is a valid translation of a virtual address.

4. The method of claim 3, wherein said virtual address is associated with an unpinned page of virtual memory.

5. The method of claim 2, wherein said DMA transfer is performed to either read data to be transmitted by said NIC from said address or to write data that has been received by said NIC to said address.

6. The method of claim 3, wherein said step of determining whether said physical address is a valid translation of a virtual address further comprises the step of:
using a translation cache to verify said physical address.

7. The method of claim 1, wherein said storage queue is one of an invalidate queue and a set of storage registers.

8. The method of claim 1, further comprising the step of: aborting said DMA transfer if said entry was invalidated.

9. The method of claim 1, wherein said step of monitoring further comprises the step of:
invalidating said entry if a message is detected on said interconnect indicating that an operating system has swapped a page of memory associated with said address.

10. A direct memory access (DMA) transfer device comprising:
a storage queue separate from a DMA command queue associated with said DMA transfer device, said storage queue for holding an entry including a memory address for which a direct memory access (DMA) transfer is pending; and
a DMA access engine for performing said DMA transfer;
wherein said storage queue monitors an interconnect during said DMA transfer and selectively invalidates said entry based on said monitoring;
further wherein said storage queue sends an abort DMA transfer signal to said DMA access engine if said entry is invalidated.

11. The DMA transfer device of claim 10, where said DMA transfer device is associated with a network interface controller (NIC) and wherein said NIC provides a transmit/receive interface between an associated multiple processor system and a plurality of other multiple processor systems via a switching fabric.

12. The DMA transfer device of claim 10, wherein said address is a physical address and further comprising:
a mechanism for determining whether said physical address is a valid translation of a virtual address.

13. The DMA transfer device of claim 12, wherein said virtual address is associated with an unpinned page of virtual memory.

14. The DMA transfer device of claim 10, wherein DMA transfer is performed either to read data to be transmitted by a network interface card (NIC) from said address or to write data that has been received by said NIC to said address.

15. The DMA transfer device of claim 11, wherein said NIC further comprises:
a translation cache for verifying said physical address.

16. The DMA transfer device of claim 10, wherein an operating system is informed if said DMA transfer was aborted.

17. The DMA transfer device of claim 10, wherein said DMA transfer is restarted after it has been aborted.

18. The DMA transfer device of claim 10, wherein said storage queue is one of an invalidate queue and a set of storage registers.

19. The DMA transfer device of claim 10, wherein said storage queue invalidates said entry if a message is detected on said interconnect indicating that an operating system has swapped a page of memory associated with said address.

20. A system for performing a direct memory access (DMA) transfer comprising:
means for placing an entry in a storage queue separate from a DMA command queue, said entry including a memory address associated with said DMA transfer;
means for monitoring an interconnect during said DMA transfer and selectively invalidating said entry based on said monitoring;
means for determining whether said entry was invalidated during said DMA transfer; and
means for aborting said DMA transfer if said entry was invalidated during said DMA transfer.

* * * * *